(12) United States Patent
Shimizu et al.

(10) Patent No.: US 8,574,717 B2
(45) Date of Patent: Nov. 5, 2013

(54) RUBBER LAMINATE

(75) Inventors: Toshiharu Shimizu, Ibaraki (JP); Akihiro Naraki, Ibaraki (JP)

(73) Assignee: Unimatec Co., Ltd., Tokyo (JP)

( * ) Notice: Subject to any disclaimer, the term of this patent is extended or adjusted under 35 U.S.C. 154(b) by 256 days.

(21) Appl. No.: 13/001,134

(22) PCT Filed: Jun. 18, 2009

(86) PCT No.: PCT/JP2009/061081
§ 371 (c)(1),
(2), (4) Date: Dec. 23, 2010

(87) PCT Pub. No.: WO2009/157361
PCT Pub. Date: Dec. 30, 2009

(65) Prior Publication Data
US 2011/0105668 A1    May 5, 2011

(30) Foreign Application Priority Data

Jun. 26, 2008  (JP) .................. 2008-166683

(51) Int. Cl.
*B32B 27/28* (2006.01)
*C08F 8/00* (2006.01)

(52) U.S. Cl.
USPC ........... 428/421; 428/520; 524/423; 524/445; 524/451; 524/545; 524/546; 525/326.3

(58) Field of Classification Search
USPC .................. 524/545, 546; 525/326.3; 568/66; 544/194
See application file for complete search history.

(56) References Cited

U.S. PATENT DOCUMENTS

| | | | |
|---|---|---|---|
| 3,752,787 A * | 8/1973 | Ruth de Brunner | 524/545 |
| 3,951,913 A * | 4/1976 | Kometani et al. | 525/151 |
| 4,569,958 A * | 2/1986 | Maeda et al. | 524/100 |
| 4,833,212 A * | 5/1989 | Yamada et al. | 525/359.2 |
| 5,874,506 A * | 2/1999 | Tatsu et al. | 525/340 |
| 6,340,511 B1 * | 1/2002 | Kanbe et al. | 428/36.91 |
| 2010/0068436 A1 * | 3/2010 | Shimizu et al. | 428/36.91 |

FOREIGN PATENT DOCUMENTS

| | | |
|---|---|---|
| DE | 3915318 A * | 12/1989 |
| EP | 737714 A1 * | 10/1996 |
| JP | 55-159975 | 12/1980 |
| JP | 58222129 A * | 12/1983 |
| JP | 61-242840 | 10/1986 |
| JP | 62-6987 | 2/1987 |
| JP | 64-014029 | 1/1989 |
| JP | 04-094930 | 3/1992 |
| JP | 05-286080 | 11/1993 |
| JP | 06-279593 | 10/1994 |
| JP | 06-306184 | 11/1994 |
| JP | 11-315966 | 11/1999 |
| WO | WO 2008050588 A1 * | 5/2008 |

OTHER PUBLICATIONS

Derwent Abstract of DE 3915318 A, 1993.*
JPO Abstract of JP 58222129 A, 1983.*
Nakamura et al., "Studies on crosslinking adhesion (II). Crosslinking of fluororubber to nitrile or epichlorohydrin rubber", Nippon Gomu Kyokaishi (1984), 57(9), 561-569.*
Translation of Nakamura et al., "Studies on crosslinking adhesion (II). Crosslinking of fluororubber to nitrile or epichlorohydrin rubber", Nippon Gomu Kyokashi, May 2013.*
International Preliminary Report on Patentability and Written Opinion from corresponding PCT application No. PCT/JP2009/061081 dated Feb. 17, 2011, 5 pgs.
International Search Report from corresponding PCT application No. PCT/JP2009/061081 dated Sep. 15, 2009, 4 pgs.

* cited by examiner

*Primary Examiner* — Nicole M Buie-Hatcher
(74) *Attorney, Agent, or Firm* — Brinks Hofer Gilson & Lione

(57) ABSTRACT

Disclosed is a rubber laminate containing an unvulcanized fluororubber composition comprising: (A) fluororubber comprising a terpolymer containing 50 to 60 mol % of a constitutional unit derived from vinylidene fluoride, 20 to 30 mol % of a constitutional unit derived from tetrafluoroethylene, and 10 to 30 mol % of a constitutional unit derived from hexafluoropropene; (B) an oxide and/or hydroxide of a divalent metal; (C) a polyhydroxy aromatic compound; (D) a 2-substituted-4,6-dithiol-s-triazine derivative; ($E_1$) a quaternary phosphonium salt or a tetraalkyl ammonium salt; ($E_2$) 1,8-diazabicyclo[5.4.0]undecene-7 (salt); and ($E_3$) a 5-substituted-1,5-diazabicyclo[4.3.0]-5-nonene (salt). In this rubber laminate, the fluororubber layer and the NBR layer are firmly vulcanization-bonded to each other without impairing various excellent characteristics of the fluororubber constituting the rubber layer.

10 Claims, No Drawings

RUBBER LAMINATE

TECHNICAL FIELD

The present invention relates to a rubber laminate. More particularly, the present invention relates to a rubber laminate obtained by vulcanization-bonding of an unvulcanized fluororubber composition and an unvulcanized NBR composition.

BACKGROUND ART

Fluororubbers are excellent in heat resistance, oil resistance, solvent resistance, chemical resistance, and other properties, and used as rubbers having excellent gasohol resistance and sour gasoline resistance. In recent years, these properties are becoming more important along with the strengthening of environmental regulations (e.g., gasoline volatility regulation), and fluororubbers are progressing at a higher degree of fluorination.

While fluororubbers have such excellent properties, they are more expensive than other rubber materials, such as NBR. Therefore, a rubber laminate in which an NBR layer is laminated on a fluororubber layer is used. However, there are problems that fluororubbers and NBR cannot be vulcanization-bonded by an ordinary method, or even if they are bonded to each other, the bonding strength therebetween is very weak.

Patent Document 1 discloses a laminate in which a fluorine-containing polymer layer and a diene-based polymer layer are firmly bonded to each other by heating, the fluorine-containing polymer layer containing:
 (A) a 2-substituted-4,6-dithiol-s-triazine derivative;
 (B) an oxide, hydroxide, or carbonate of an alkaline earth metal; and
 (C) 1,8-diazabicyclo[5.4.0]undecene or a 2-ethylhexyl salt thereof, etc. and/or a quaternary ammonium salt, etc.

Thus, the composition of the fluorine-containing polymer layer is devised on compounding; however, a fluororubber layer is used as the fluorine-containing polymer layer, causing problems that when the fluorine content in the fluororubber layer increases, sufficient bonding strength cannot be achieved, or peeling occurs at the bonding interface.

Further, it is proposed that a quaternary onium salt is added to a fluororubber layer to be laminated on an NBR layer in the production of the fluororubber layer, as listed below.

(1) A double-layer rubber hose suitable as an automotive fuel hose, in which the fluororubber layer is composed of a ternary-based fluororubber that is a polyol based-vulcanization system together with a quaternary ammonium salt, and satisfies a specific vulcanization induction time ($T_{10}$); and an NBR layer is composed of peroxide vulcanization system NBR, to which an active hydrogen-containing functional group is introduced (see Patent Document 2).

(2) A rubber laminate comprising a peroxide crosslinkable NBR composition containing a specific phosphonium salt, and a metal oxide-containing fluororubber composition (see Patent Document 3).

(3) A rubber laminate prepared by vulcanization-bonding of an unvulcanized fluororubber composition and an unvulcanized NBR composition containing sulfur (donating compound), an organic peroxide, and an organic phosphonium salt (see Patent Document 4).

(4) A fuel hose having an inner layer composed of fluororubber, and an outer layer composed of an NBR-PVC-blended polymer, wherein the PVC content in the blend material and the combined acrylonitrile content in NBR are controlled at a constant level, and a 1,8-diazabicyclo[5.4.0] undecene-7 salt of a carboxylic acid is added (see Patent Document 5).

PRIOR ART DOCUMENT

Patent Document

Patent Document 1: JP-B-62-6987
Patent Document 2: JP-A-5-286080
Patent Document 3: JP-A-6-279593
Patent Document 4: JP-A-6-306184
Patent Document 5: JP-A-11-315966

OUTLINE OF THE INVENTION

Problem to be Solved by the Invention

An object of the present invention is to provide a rubber laminate obtained by vulcanization-bonding of an unvulcanized fluororubber composition and an unvulcanized NBR composition, wherein the fluororubber layer and the NBR layer are firmly vulcanization-bonded to each other without impairing various excellent characteristics of the fluororubber constituting the fluororubber layer.

Means for Solving the Problem

The object of the present invention can be attained by the above rubber laminate in which the unvulcanized fluororubber composition comprising:
 (A) 100 parts by weight of a fluororubber comprising a terpolymer containing 50 to 60 mol % of a constitutional unit derived from vinylidene fluoride, 20 to 30 mol % of a constitutional unit derived from tetrafluoroethylene, and 10 to 30 mol % of a constitutional unit derived from hexafluoropropene (total: 100 mol %);
 (B) 1 to 40 parts by weight of an oxide and/or hydroxide of a divalent metal;
 (C) 0.5 to 10 parts by weight of a polyhydroxy aromatic compound;
 (D) 0.1 to 5 parts by weight of a 2-substituted-4,6-dithiol-s-triazine derivative;
 ($E_1$) 0.1 to 5 parts by weight of a quaternary phosphonium salt or a tetraalkyl ammonium salt vulcanization accelerator;
 ($E_2$) 0.01 to 2 parts by weight of 1,8-diazabicyclo[5.4.0] undecene-7 or a salt thereof; and
 ($E_3$) 0.01 to 2 parts by weight of a 5-substituted-1,5-diazabicyclo[4.3.0]-5-nonene or a salt thereof.

Effect of the Invention

The rubber laminate of the present invention sufficiently satisfies interlayer adhesiveness that is determined by peeling strength and bonding state, while oil resistance is hardly impaired. Therefore, the rubber laminates can be effectively used as fuel system parts, such as automotive fuel hoses, fuel transportation hoses, and diaphragms.

EMBODIMENTS FOR CARRYING OUT THE INVENTION

The component (A), i.e., a fluororubber, includes highly fluorinated rubbery copolymers, such as copolymers of vinylidene fluoride with other fluorine-containing olefins.

Among such copolymers, vinylidene fluoride-tetrafluoroethylene-hexafluoropropene terpolymer is preferred.

The vinylidene fluoride-tetrafluoroethylene-hexafluoropropene terpolymer, which is a preferred fluorinated rubbery copolymer, preferably contains 50 to 60 mol % of a constitutional unit derived from vinylidene fluoride [VdF], 20 to 30 mol % of a constitutional unit derived from tetrafluoroethylene [TFE], and 10 to 30 mol % of a constitutional unit derived from hexafluoropropene [HFP] (total: 100 mol %).

When the amount of the VdF-derived constitutional unit is more than 60 mol %, adhesion to the NBR layer is increased, while oil resistance, chemical resistance, and fuel oil permeation resistance are remarkably reduced. In contrast, when the amount is less than 50 mol %, oil resistance, chemical resistance, and fuel oil permeation resistance are increased, while not only cold resistance is deteriorated, but also sufficient adhesion to the NBR layer cannot be obtained.

When the amount of the TFE-derived constitutional unit is more than 30 mol %, not only cold resistance is deteriorated, but also the elasticity of the obtained fluorine-containing elastomer vulcanizate is reduced. In contrast, when the amount is less than 20 mol %, oil resistance and chemical resistance may be reduced.

When the amount of the HFP-derived constitutional unit is more than 30 mol %, compression set may be remarkably deteriorated. In contrast, when the amount is less than 10 mol %, rubber elasticity is reduced.

As the component (B), i.e., an oxide and/or hydroxide of a divalent metal, at least one oxide or hydroxide of Mg, Ca, Ba, Pb, Zn, and other metals is used in an amount of about 1 to 40 parts by weight, preferably about 3 to 15 parts by weight, based on 100 parts by weight of fluororubber.

The component (C), i.e., a polyhydroxy aromatic compound, which is used as a crosslinking-bonding agent, includes 2,2-bis(4-hydroxyphenyl)propane [bisphenol A], 2,2-bis(4-hydroxyphenyl)perfluoropropane [bisphenol AF], hydroquinone, catechol, resorcin, 4,4'-dihydroxydiphenyl, 4,4'-dihydroxydiphenylmethane, 4,4'-dihydroxydiphenylsulfone, 2,2-bis(4-hydroxyphenyl)butane, and the like. Preferably, bisphenol A, bisphenol AF, and hydroquinone are used. These may be in the form of alkali metal salts or alkaline earth metal salts.

Such a polyhydroxy aromatic compound is used in an amount of about 0.5 to 10 parts by weight, preferably about 0.5 to 6 parts by weight, based on 100 parts by weight of fluororubber. When the amount thereof is less than this range, crosslinking density is insufficient. Conversely, when the amount is more than this range, crosslinking density is overly high, leading to a tendency to lose elastomeric properties.

The component (D), i.e., a 2-substituted-4,6-dithiol-s-triazine derivative, includes 2-substituted-4,6-dithiol-s-triazine derivatives in which the 2-substituent is substituted by methyl, ethyl, propyl, n-butyl, tert-butyl, pentyl (amyl), hexyl, 2-ethylhexyl, octyl, nonyl, dodecyl, octadecyl, or other $C_1$-$C_{18}$ alkyl group; allyl, oleyl, or other $C_3$-$C_{18}$ alkenyl group; phenyl, naphthyl, or other aryl group; benzyl, methylbenzyl, phenylethyl, phenylpropyl, or other aralkyl group; ethylphenyl, buthylphenyl, octylphenyl, nonylphenyl, 4-hydroxy-3,5-di-tert-butylphenyl, or other alkyl aryl group having a $C_1$-$C_{10}$ alkyl group; dimethylamino, dibutylamino, dilaurylamino, dioctylamino, ethylphenylamino, anilino, piperidino, morpholino, carboxypropylamino, or other substituted amino group. Preferably, 2-dibutylamino-4,6-dithiol-s-triazine is used. Moreover, the component (D) may be a compound in which the hydrogen atom of the 4,6-dithiol group is substituted by alkali metal or alkaline earth metal.

Such a 2-substituted-4,6-dithiol-s-triazine derivative is used in an amount of about 0.1 to 5 parts by weight, preferably about 0.1 to 2 parts by weight, based on 100 parts by weight of fluororubber. When the amount of the derivative used is more than this range, various characteristics of the resulting vulcanizate are adversely affected. Conversely, when the amount is less than this range, adhesion to the NBR layer becomes weak.

As the component ($E_1$), i.e., a quaternary phosphonium salt vulcanization accelerator, for example, at least one of benzyltriphenylphosphonium chloride, benzyltriphenylphosphonium bromide, benzyltricyclohexylphosphonium chloride, benzyltricyclohexylphosphonium bromide, and the like is used. As a tetraalkyl ammonium salt vulcanization accelerator, for example, at least one of tetraethylammonium chloride, tetraethylammonium bromide, tetrabutylammonium chloride, tetrabutylammonium bromide, n-dodecyltrimethylammonium chloride, n-dodecyltrimethylammonium bromide, octadecyltrimethylammonium bromide, cetyltrimethylammonium chloride, and the like is used.

Such a quaternary phosphonium salt compound or a tetraalkyl ammonium salt compound is used in an amount of about 0.1 to 5 parts by weight, preferably about 0.1 to 2 parts by weight, based on 100 parts by weight of fluororubber. When the amount thereof is more than this range, various characteristics of the resulting vulcanizate are adversely affected. Conversely, when the amount is less than this range, crosslinking properties are inferior.

The component ($E_2$), i.e., 1,8-diazabicyclo[5.4.0]undecene-7 or a salt thereof (e.g., hydrochloride salt, sulfonate salt, octylate salt, or phenol salt) is used in an amount of about 0.01 to 2 parts by weight, preferably about 0.01 to 0.5 parts by weight, based on 100 parts by weight of fluororubber. When the amount thereof is more than this range, compression set is deteriorated, and rubber properties are impaired. In contrast, when the amount is less than this range, vulcanization becomes insufficient.

Example of a sulfonic acid compound forming the sulfonate of 1,8-diazabicyclo[5.4.0]undecene-7 includes benzene sulfonic acid, dodecylbenzene sulfonic acid, o-, m- or p-toluene sulfonic acid, 2,4-toluene disulfonic acid, p-aminobenzene sulfonic acid (sulfanilic acid), naphthalene sulfonic acid, 1-naphthylamine-4-sulfonic acid (naphthionic acid), p-sulfobenzoic acid, and the like. Moreover, the hydrogen atom of the component ($E_2$) cyclic ring may be substituted by another atom or substituent.

Example of the 5-substituent of 5-substituted-1,5-diazabicyclo[4.3.0]-5-nonene or a salt thereof as component ($E_3$) includes $C_1$-$C_{24}$ alkyl groups or $C_7$-$C_{20}$ aralkyl groups; preferably, benzyl groups are used. As the salt thereof, tetrafluoroborate or hexafluorophosphate salts are preferably used.

The component ($E_3$) is used in an amount of about 0.01 to 2 parts by weight, preferably about 0.01 to 0.5 parts by weight, based on 100 parts by weight of fluororubber. When the amount thereof is more than this range, various characteristics of the resulting vulcanizate are adversely affected. Conversely, when the amount is less than this range, adhesion to the NBR layer becomes significantly worse.

Among the aforementioned components of the unvulcanized fluororubber composition, the polyhydroxy aromatic compound (C), the quaternary phosphonium salt or tetraalkyl ammonium salt vulcanization accelerator ($E_1$), and the 5-substituted-1,5-diazabicyclo[4.3.0]-5-nonene or salt thereof ($E_3$) may be directly compounded as composition components and kneaded. Alternatively, in order to prevent poor dispersion, it is preferable to use at least one of these components, preferably each of the components, as a masterbatch with an unvulcanized fluororubber. Further, the 1,8-diazabicyclo[5.4.0]undecene-7 or salt thereof ($E_2$) may be directly compounded as a composition component and kneaded. Alternatively, in order to prevent poor dispersion, it is preferable to use the component ($E_2$) as a masterbatch in which the component ($E_2$) is diluted and dispersed with fillers, such as carbon black, silica, clay, talc, diatomaceous earth, and barium sulfate.

In addition to the above-described essential components, known fillers, reinforcing agent, plasticizers, lubricants, processing aids, pigments, etc., that are generally used in fluororubber compositions may be added to the unvulcanized fluororubber composition.

As the unvulcanized NBR to be laminated and vulcanization-bonded with the unvulcanized fluororubber composition, any NBR having an acrylonitrile content of 30 to 50 wt. % and allowing sulfur vulcanization with sulfur or a sulfur donating compound, or peroxide crosslinking with an organic peroxide can be used.

NBR may also be, other than acrylonitrile and butadiene, a ternary-based polymer prepared by copolymerizing a small amount of acrylic acid, methacrylic acid, or ester group, or a monomer having anti-aging functions; hydrogenerated NBR prepared by partially or substantially completely hydrogenating NBR; or a blend polymer prepared by blending NBR with polyvinyl chloride, ethylene-propylene(-diene) copolymerized rubber, or the like.

These unvulcanized fluororubber composition and unvulcanized NBR composition can produce a rubber laminate comprising a fluororubber layer and an NBR layer by laminating an unvulcanized sheet obtained from the fluororubber composition and an unvulcanized sheet obtained from the NBR composition, and subjecting the resultant laminate to press vulcanization at about 0.1 to 15 MPa at about 100 to 200° C. for about 3 to 60 minutes. The fluororubber layer is generally laminated in a thickness of about 0.1 to 5 mm, and the NBR layer is generally laminated in a thickness of about 0.1 to 5 mm; however, there is no limitation to the thickness of each rubber layer, the thickness ratio of the layers, and the thickness of the entire rubber laminate.

EXAMPLES

The following describes the present invention with reference to examples.

Reference Example 1

Present Invention

Ammonium perfluorooctanoate (10 g), 6.3 g of disodium hydrogen phosphate, and 5 L of deionized water were placed in a 10-L autoclave. The air in the autoclave was sufficiently substituted by nitrogen gas, followed by degassing, and 5 g of isopropanol was added thereto. Then, 68 g of vinylidene fluoride [VdF], 52 g of tetrafluoroethylene [TFE], and 500 g of hexafluoropropene [HFP] were charged. After the temperature in the autoclave was increased to 80° C., 4 g of ammonium persulfate was added to initiate the polymerization reaction. The internal pressure at this time was 1.6 MPa.

Thereafter, a mixed gas of VdF/TFE/HFP (molar ratio: 53/28/19) was compressed into the autoclave until the internal pressure reached 2.6 MPa. When the internal pressure dropped to 2.5 MPa, the above mixed gas was compressed into the autoclave as divided-adding gas until the pressure reached 2.6 MPa. This operation was repeated. The total amount of each component charged was as follows:

VdF: 752 g
TFE: 608 g
HFP: 620 g

After the polymerization reaction was continued for 4 hours, the remaining gas was purged, and the reaction was terminated.

The obtained aqueous latex (solid matters content: 31.5 wt. %, pH: about 4) was coagulated in a 1 wt. % aqueous calcium chloride solution. After washing with water, drying was performed in a steam oven at 70° C. for 24 hours, thereby obtaining a rubbery terpolymer.

Reference Example 2

Outside of the Present Invention

Ammonium perfluorooctanoate (10 g), 6.3 g of disodium hydrogen phosphate, and 5 L of deionized water were placed in a 10-L autoclave. The air in the autoclave was sufficiently substituted by nitrogen gas, followed by degassing, and 5 g of isopropanol was added thereto. Then, 83 g of vinylidene fluoride [VdF], 50 g of tetrafluoroethylene [TFE], and 390 g of hexafluoropropene [HFP] were charged. After the temperature in the autoclave was increased to 80° C., 4 g of ammonium persulfate was added to initiate the polymerization reaction. The internal pressure at this time was 1.5 MPa.

Thereafter, a mixed gas of VdF/TFE/HFP (molar ratio: 58/22/20) was compressed into the autoclave until the internal pressure reached 3.0 MPa. When the internal pressure dropped to 2.9 MPa, the above mixed gas was compressed into the autoclave as divided-adding gas until the pressure reached 3.0 MPa. This operation was repeated. The total amount of each component charged was as follows:

VdF: 867 g
TFE: 520 g
HFP: 690 g

After the polymerization reaction was continued for 4 hours, the remaining gas was purged, and the reaction was terminated. After the termination of the reaction, the same treatment as in Reference Example 1 was carried out.

Reference Example 3

Outside of the Present Invention

Ammonium perfluorooctanoate (10 g), 6.3 g of disodium hydrogen phosphate, and 5 L of deionized water were placed in a 10-L autoclave. The air in the autoclave was sufficiently substituted by nitrogen gas, followed by degassing, and 5 g of isopropanol was added thereto. Then, 54 g of vinylidene fluoride [VdF], 60 g of tetrafluoroethylene [TFE], and 530 g of hexafluoropropene [HFP] were charged. After the temperature in the autoclave was increased to 80° C., 6 g of ammonium persulfate was added to initiate the polymerization reaction. The internal pressure at this time was 1.6 MPa.

Thereafter, a mixed gas of VdF/TFE/HFP (molar ratio: 45/33/22) was compressed into the autoclave until the internal pressure reached 2.2 MPa. When the internal pressure dropped to 2.1 MPa, the above mixed gas was compressed into the autoclave as divided-adding gas until the pressure reached 2.2 MPa. This operation was repeated. The total amount of each component charged was as follows:

VdF: 596 g
TFE: 690 g
HFP: 670 g

After the polymerization reaction was continued for 4 hours, the remaining gas was purged, and the reaction was terminated. After the termination of the reaction, the same treatment as in Reference Example 1 was carried out.

Table 1 below shows the polymer Mooney viscosity $ML_{1+10}$ (121° C.), polymer composition (determined by $^{19}F$-NMR), and F content of each of the VdF/TFE/HFP terpolymer rubbers (fluororubbers A, B, and C) obtained in the above reference examples.

TABLE 1

| Fluororubber | $ML_{1+10}$ (121° C.) | VdF/TFE/HFP (mol %) | F content (wt. %) |
|---|---|---|---|
| A (Ref. Ex. 1) | 30 | 54/26/20 | 69.9 |
| B (Ref. Ex. 2) | 31 | 64/18/18 | 68.4 |
| C (Ref. Ex. 3) | 31 | 48/30/22 | 70.8 |

Reference Example 4

| | |
|---|---|
| Fluororubber A | 100 parts by weight |
| SRF carbon black | 13 parts by weight |
| Calcium hydroxide | 6 parts by weight |
| Magnesium oxide | 3 parts by weight |
| 2-dibutylamino-4,6-diol-s-triazine | 0.5 parts by weight |
| Bisphenol AF 50% fluororubber A masterbatch | 4.2 parts by weight |
| Benzyltriphenylphosphonium chloride 35% fluororubber A masterbatch | 1.7 parts by weight |
| 1,8-diazabicyclo[5.4.0]undecene-7 10% SRF carbon black masterbatch | 0.5 parts by weight |
| 5-benzyl-1,5-diazabicyclo[4.3.0]-5-nonenium tetrafluoroborate 35% fluororubber A masterbatch | 0.5 parts by weight |

The above components were kneaded on a roll to prepare a fluororubber composition I.

Reference Example 5

In Reference Example 4, the same amount of fluororubber B was used in place of the fluororubber A, and the fluororubber B was also used as a masterbatch rubber, thereby preparing a fluororubber composition II.

Reference Example 6

In Reference Example 4, the same amount of fluororubber C was used in place of the fluororubber A, and the fluororubber C was also used as a masterbatch rubber, thereby preparing a fluororubber composition III.

Reference Example 7

In Reference Example 4, in which the fluororubber A was used, a fluororubber composition IV was prepared without using the component ($E_3$), i.e., 5-benzyl-1,5-diazabicyclo[4.3.0]-5-nonenium tetrafluoroborate 35% fluororubber A masterbatch.

Reference Example 8

In Reference Example 5, in which the fluororubber B was used, a fluororubber composition V was prepared without using the component ($E_3$), i.e., 5-benzyl-1,5-diazabicyclo[4.3.0]-5-nonenium tetrafluoroborate 35% fluororubber A masterbatch.

Reference Example 9

In Reference Example 4, in which the fluororubber A was used, a fluororubber composition VI was prepared using the same amount (0.5 parts by weight) of 1-benzyl-3,5-dimethylpyridinium chloride 35% fluororubber A masterbatch in place of the component ($E_3$), i.e., 5-benzyl-1,5-diazabicyclo[4.3.0]-5-nonenium tetrafluoroborate 35% fluororubber A masterbatch.

Reference Example 10

In Reference Example 4, in which the fluororubber A was used, a fluororubber composition VII was prepared using the same amount (0.5 parts by weight) of (1-phenylmethyl-4-piperidino)pyridinium chloride 35% fluororubber A masterbatch in place of the component ($E_3$), i.e., 5-benzyl-1,5-diazabicyclo[4.3.0]-5-nonenium tetrafluoroborate 35% fluororubber A masterbatch.

Each of the fluororubber compositions obtained in above Reference Examples 4 to 10 was subjected to press vulcanization at 160° C. for 40 minutes, and the resulting vulcanizate was measured for the following items. As a result of measurement of scorch time t5 (125° C.; the time required for Mooney viscosity to be a value of the minimum value plus 5, which provides an indication of the storage stability and processing safety) of each fluororubber composition, all the composition showed a scorch time of 30 minutes or more.

Hardness: measured according to JIS K6301, which corresponds to ASTM D1415, and using a spring type hardness tester Type A 100% modulus: measured according to JIS K6301; tensile stress and elongation rate required to stretch a sheet-like specimen (25×100×2 mm) by 100% at 23° C. were measured to determine values of 100% modulus Tensile test: No. 3 dumbbell specimen punched from 2 mm-thick sheet was subjected to a tensile test according to JIS K6301 at a tensile rate of 50 cm/min, and breaking strength and elongation at break were measured Compression set: measured according to JIS K6262, which corresponds to ASTM D395; 25% compression, 125° C., 70 hours (acceptance: 65% or less)

The obtained results are shown in Table 2 below.

TABLE 2

| | Fluororubber composition | | | | | | |
|---|---|---|---|---|---|---|---|
| Measurement item | I | II | III | IV | V | VI | VII |
| Hardness (JIS A) | 71 | 71 | 70 | 71 | 71 | 70 | 71 |
| 100% modulus (MPa) | 3.3 | 3.2 | 4.1 | 3.2 | 3.1 | 3.3 | 3.2 |
| Breaking strength (MPa) | 12 | 12.5 | 13 | 12.1 | 12.4 | 11.6 | 11.4 |
| Elongation at break (%) | 330 | 350 | 280 | 330 | 340 | 340 | 320 |
| Compression set (%) | 63 | 58 | 67 | 62 | 56 | 73 | 72 |

Reference Example 11

| | |
|---|---|
| NBR (N223L, a product of JSR; CN content: 41%) | 100 parts by weight |
| SRF carbon black | 40 parts by weight |
| Stearic acid | 1 part by weight |
| Zinc oxide | 5 parts by weight |
| Sulfur | 1.5 parts by weight |
| Vulcanization accelerator (MBTS, a product of Ouchi Shinko Chemical; dibenzothiazyl disulfide) | 1 part by weight |

The above components were kneaded on a roll to prepare an NBR composition I.

Reference Example 12

| | |
|---|---|
| NBR (N223L) | 100 parts by weight |
| SRF carbon black | 30 parts by weight |
| Plasticizer (RS-107, a product of ADEKA; dibutyl carbitol adipate) | 4 parts by weight |
| Magnesium oxide | 5 parts by weight |
| Triallyl isocyanurate (TAIC, a product of Nippon Kasei Chemical; the component content: 60%) | 4 parts by weight |
| Dicumyl peroxide (Percumyl D-40, a product of NOF Corporation; the component content: 40%) | 2 parts by weight |

The above components were kneaded on a roll to prepare an NBR composition II.

Examples 1 and 2, and Comparative Examples 1 to 12

(1) An unvulcanized sheet (thickness: 3 mm) obtained from the fluororubber composition and an unvulcanized sheet (thickness: 3 mm) obtained from the NBR composition were laminated to each other, and subjected to press vulcanization at 160° C. for 40 minutes at a pressing pressure of 100 kgf/cm² (9.8 MPa). A sample (100×10 mm) punched from the resulting laminated sheet (thickness: 4 mm) was subjected to a peel test at a peeling rate of 100 mm/min; samples having a peeling strength of 3.0 KN/m or more were considered as acceptance. Those undergoing rubber broken (a condition in which breaking occurs in the rubber phase because of strong bonding force in the bonding surface) are also be considered to have good bonding strength.

(2) An unvulcanized sheet (thickness: 0.5 mm) obtained from the fluororubber composition and an unvulcanized sheet (thickness: 1.7 mm) obtained from the NBR composition were laminated to each other, and subjected to preliminary vulcanization at 130° C. for 20 minutes at a pressing pressure of 20 kgf/cm² (1.96 MPa). The resulting laminated sheet was wound around a resin-made mandrel having a diameter of 5 mm with the fluororubber layer side down, and subjected to steam vulcanization (true vulcanization) at 160° C. for 40 minutes. The steam pressure used herein was about 5.2 kgf/cm² (0.51 MPa). The vulcanizate was cut with a knife, and the bonding state of the cross section of the vulcanizate was observed with an optical microscope.

(3) An unvulcanized sheet (thickness: 4 mm) obtained from the fluororubber composition was subjected to press vulcanization at 160° C. for 40 minutes at a pressing pressure of 100 kgf/cm² (9.8 MPa). A sample (30×10 mm) punched from the obtained sheet (thickness: 2 mm) was immersed in a mixed solvent of isooctane/toluene/methanol (volume ratio: Oct. 10, 1980) at 40° C. for 48 hours. Thereafter, the volume change ΔV (%) of the sample was measured and evaluated as follows:

Volume change is very small, and condition is good: ◉

Volume change is small, and condition is good: ○

Volume change is large, and use is difficult: X

The results of measurement and evaluation of each item are shown in Table 3 below.

TABLE 3

| | Fluoro-rubber Composition | NBR Composition | Adhesiveness evaluation | | Oil resistance | |
|---|---|---|---|---|---|---|
| Example | | | Peeling strength (KN/m) | Bonding state | ΔV (%) | Evaluation |
| Ex. 1 | I | I | 3.5 | No peeling | 10.7 | ○ |
| Ex. 2 | I | II | 3.0 | No peeling | 10.9 | ○ |
| Comp. Ex. 1 | II | I | Rubber broken | No peeling | 18.4 | X |
| Comp. Ex. 2 | III | I | 0.9 | Significant peeling | 5.8 | ◉ |
| Comp. Ex. 3 | IV | I | 3.2 | Peeling in several places | 11.0 | ○ |
| Comp. Ex. 4 | V | I | Rubber broken | No peeling | 17.6 | X |
| Comp. Ex. 5 | VI | I | 3.1 | No peeling | 11.1 | ○ |
| Comp. Ex. 6 | VII | I | 3.0 | No peeling | 10.8 | ○ |
| Comp. Ex. 7 | II | II | Rubber broken | No peeling | 19.2 | X |
| Comp. Ex. 8 | III | II | 0.6 | Significant peeling | 6.0 | ◉ |
| Comp. Ex. 9 | IV | II | 2.5 | Peeling in several places | 10.8 | ○ |
| Comp. Ex. 10 | V | II | Rubber broken | No peeling | 18.0 | X |
| Comp. Ex. 11 | VI | II | 2.6 | No peeling | 10.6 | ○ |
| Comp. Ex. 12 | VII | II | 2.7 | No peeling | 11.0 | ○ |

The results of Tables 2 and 3, in which the NBR composition I was used, are summarized in Table 4 below.

TABLE 4

| | Fluororubber composition | | | Evaluation | | |
|---|---|---|---|---|---|---|
| Example | Composition | Rubber | ($E_3$) | Adhesiveness | Oil resistance | Compression set |
| Ex. 1 | I | A | Added | ○ | ○ | ○ |
| Comp. Ex. 1 | II | B | Added | ◉ | X | ○ |
| Comp. Ex. 2 | III | C | Added | X | ◉ | Δ |
| Comp. Ex. 3 | IV | A | Not added | X | ○ | ○ |
| Comp. Ex. 4 | V | B | Not added | ◉ | X | ○ |
| Comp. Ex. 5 | VI | A | Other component | ○ | ○ | X |
| Comp. Ex. 6 | VII | A | Other component | ○ | ○ | X |

The above results indicate the following:

(1) When a fluororubber having an undefined copolymerization ratio is used, oil resistance is deteriorated (Comparative Example 1), and bonding properties are deteriorated (Comparative Example 2).

(2) When the component ($E_3$) is not added, bonding properties are reduced even with the use of the fluororubber A (Comparative Example 3).

(3) When the fluororubber B having an undefined copolymerization ratio is used, the presence of the component ($E_3$) has no influence (Comparative Examples 1 and 4).

(4) When a pyridinium salt is used in place of the component ($E_3$), compression set is inevitably deteriorated even with the use of the fluororubber A (Comparative Examples 5 and 6).

(5) The comparison of the rubber laminate comprising sulfur vulcanizable type NBR of Example 1 with those of Comparative Examples 5 and 6 in Table 3 shows a clear difference in peeling strength.

(6) The comparison of the rubber laminate comprising peroxide crosslinkable type NBR of Example 2 with those of Comparative Examples 11 and 12 in Table 3 shows a clear difference in peeling strength.

The invention claimed is:

1. A rubber laminate obtained by vulcanization-bonding of an unvulcanized fluororubber composition and an unvulcanized NBR composition, the unvulcanized fluororubber composition comprising:
(A) 100 parts by weight of a fluororubber comprising a terpolymer containing 50 to 60 mol % of a constitutional unit derived from vinylidene fluoride, 20 to 30 mol % of a constitutional unit derived from tetrafluoroethylene, and 10 to 30 mol % of a constitutional unit derived from hexafluoropropene, total: 100 mol %;
(B) 1 to 40 parts by weight of an oxide and/or hydroxide of a divalent metal;
(C) 0.5-10 parts by weight of a polyhydroxy aromatic compound;
(D) 0.1 to 5 parts by weight of a 2-substituted-4,6-dithiol-s-triazine derivative;
($E_1$) 0.1 to 5 parts by weight of a quaternary phosphonium salt or a tetraalkyl ammonium salt vulcanization accelerator;
($E_2$) 0.01 to 2 parts by weight of 1,8-diazabicyclo[5.4.0]undecene-7 or a salt thereof; and
($E_3$) 0.01 to 2 parts by weight of a 5-substituted-1,5-diazabicyclo[4.3.0]-5-nonene or a salt thereof.

2. The rubber laminate according to claim 1, wherein the unvulcanized NBR composition is a composition of NBR vulcanizable with sulfur vulcanization or peroxide crosslinking, and having an acrylonitrile content of 30 to 50 wt. %.

3. The rubber laminate according to claim 1, wherein the 2-substituted-4,6-dithiol-s-triazine as the component (D) is 2-dibutylamino-4,6-dithiol-s-triazine.

4. The rubber laminate according to claim 1, wherein the 5-substituted-1,5-diazabicyclo[4.3.0]-5-nonene or a salt thereof as the component ($E_3$) is a compound substituted by a $C_1$-$C_{24}$ alkyl group or a $C_7$-$C_{20}$ aralkyl group at position 5.

5. The rubber laminate according to claim 4, wherein the 5-substituted-1,5-diazabicyclo[4.3.0]-5-nonene is 5-benzyl-1,5-diazabicyclo[4.3.0]-5-nonene.

6. The rubber laminate according to claim 4, wherein the salt of 5-substituted-1,5-diazabicyclo[4.3.0]-5-nonene is a tetrafluoroborate salt or a hexafluorophosphate salt.

7. The rubber laminate according to claim 1, wherein at least one of the components (C), ($E_1$), and ($E_3$) is used as a masterbatch with an unvulcanized fluororubber.

8. The rubber laminate according to claim 1, wherein the component ($E_2$) is used as a masterbatch with a filler.

9. The rubber laminate according to claim 8, wherein the filler is carbon black, silica, clay, talc, diatomaceous earth, or barium sulfate.

10. A fuel system part formed from the rubber laminate according to claim 1.

* * * * *

UNITED STATES PATENT AND TRADEMARK OFFICE
CERTIFICATE OF CORRECTION

| | | |
|---|---|---|
| PATENT NO. | : 8,574,717 B2 | Page 1 of 1 |
| APPLICATION NO. | : 13/001134 | |
| DATED | : November 5, 2013 | |
| INVENTOR(S) | : Shimizu et al. | |

It is certified that error appears in the above-identified patent and that said Letters Patent is hereby corrected as shown below:

In the Specification

Column 1 lines 2-5 insert

-- RELATED APPLICATION

This application is a 371 national phase filing of International Patent Application No. PCT/JP2009/061081, filed June 18, 2009, through which and to which priority is claimed under 37 U.S.C. §119 to Japanese Application No. 2008-166683, filed June 26, 2008. --

Signed and Sealed this
Sixth Day of October, 2015

Michelle K. Lee
*Director of the United States Patent and Trademark Office*